Figure 1:
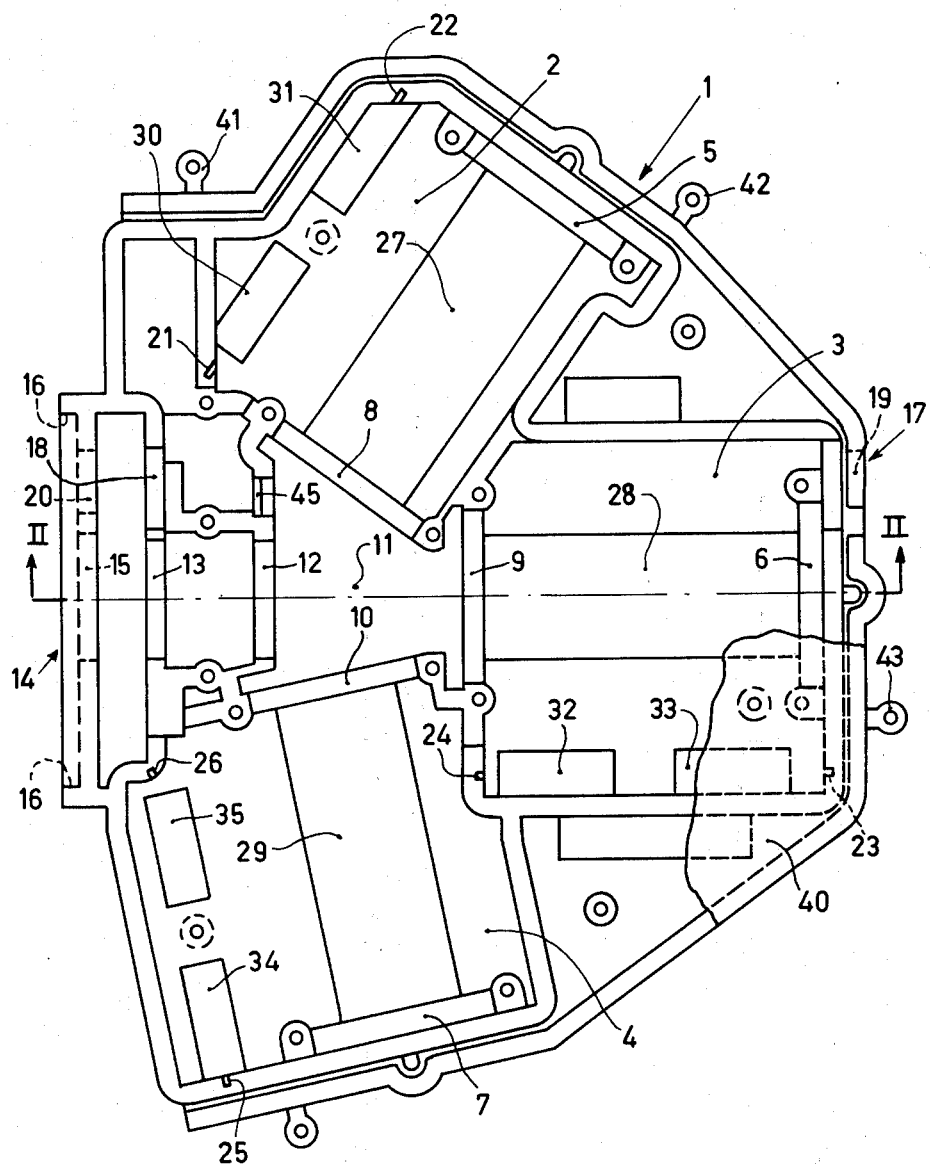

United States Patent [19]

Needs et al.

[11] 4,057,837
[45] Nov. 8, 1977

[54] TELEVISION CAMERA COMPRISING A RIGID HOUSING

[75] Inventors: Howard Curtis Needs; Harald Henricus Cornelis Maria Spapens, both of Eindhoven, Netherlands

[73] Assignee: U.S. Philips Corporation, New York, N.Y.

[21] Appl. No.: 652,546

[22] Filed: Jan. 26, 1976

[30] Foreign Application Priority Data

Feb. 19, 1975 Netherlands .................. 7501931

[51] Int. Cl.² ............................................. H04N 5/64
[52] U.S. Cl. .................................. 358/254; 358/50; 358/55
[58] Field of Search .............. 178/7.92; 358/55, 50, 358/52, 254

[56] References Cited

U.S. PATENT DOCUMENTS

| 2,712,035 | 6/1955 | Jackson | 178/7.92 |
| 3,017,454 | 1/1962 | James et al. | 358/55 |
| 3,315,030 | 4/1967 | Wright | 358/55 |
| 3,471,637 | 10/1969 | Perkins | 358/55 |

OTHER PUBLICATIONS

"TV Cameras Gain in Response and Mobility," Design Engineering, Aug., 1971, pp. 45-48.

Primary Examiner—Richard Murray
Attorney, Agent, or Firm—Frank R. Trifari; Carl P. Steinhauser

[57] ABSTRACT

A portable television camera comprises a rigid housing accommodating the optical components, such as an entrance optical system, a color splitting optical system and the pick-up tubes which are arranged to bear on abutment faces which are strictly localized with respect to each other. The strict positioning of these components with respect to each other enables the use of pick-up tubes and an entrance optical system which are comparatively cheap, and combines low weight with good image quality.

12 Claims, 3 Drawing Figures

TELEVISION CAMERA COMPRISING A RIGID HOUSING

The invention relates to a television camera comprising more than one pick-up tube and an entrance optical system with an optical distribution system. In cameras of this kind it is necessary to mount the pick-up tubes in a strictly defined position with respect to the optical distribution system. In known cameras different approaches have been followed to arrive at an appropriate solution. The distribution system is often used as a base for mounting. The pick-up tubes are then connected to the distribution system either as rigidly as possible or with a high degree of adjustment freedom. The comparatively elongate pick-up tubes have their entrance windows facing the distribution system. This means that the longitudinal axes of the pick-up tubes extend transversely of the distribution system. Adequately rigid mounting thus results in a heavy and comparatively expensive assembly. The readjustment of pick-up tubes with respect to the distribution system in a finished camera is rather time-consuming and is burdensome the user.

The invention has for its object to eliminate these drawbacks and to provide a television camera which is comparatively light, cheap, rugged and simple to assemble. To this end, a television camera of the kind set forth according to the invention is characterized in that the entrance optical system and the pick-up tubes are situated in a common axial plane, two walls extending parallel to this axial plane, forming an integral rigid housing, in conjunction with partitions of spaces for different components, wherein at least the distribution optical system and the pick-up tubes are mounted and located relative to each other.

In a camera in accordance with the invention, a housing which is to be manufactured completely separately and which is extremely rigid thanks to the described construction, acts as a mounting block for at least optical and electronoptical components. Because of the provision of reference and supporting faces in the housing, these components can be rigidly and very accurately mounted relative to each other. When the various dimensions of the housing are adapted to the geometry of the components to be used, or when the geometry of supports for components to be used is adapted to the construction of the housing, the components can be readily mounted and yet exactly fixed in the housing like in a modular construction. This results in a simple camera construction and easy exchange of the components, if necessary.

A preferred embodiment of the housing comprises, besides the spaces for the pick-up tubes and the optical distribution system, spaces with abutment faces for an optical imaging system which comprises, for example, a main lens and a zoom lens, and a space, possibly with abutment faces, for a viewfinder. Spaces can also be included for the mounting of preamplfiers near each of the pick-up tubes. The housing can also have connected to it fixing means and possibly abutment faces for the mounting further components such as electronic circuits and further optical components. One of the two parallel walls can extend mainly outside the transverse partitions of the housing strengthening the housing further on and delivering mounting flanges.

In order to eliminate interference fields, the housing wall is constructed to be electrically conductive in a preferred embodiment. Heat leaks are provided to control the temperature inside the housing. To this end, components giving off comparatively little heat can be used.

Some preferred embodiments of a television camera in accordance with the invention will be described hereinafter with reference to the drawing.

Figure 2:
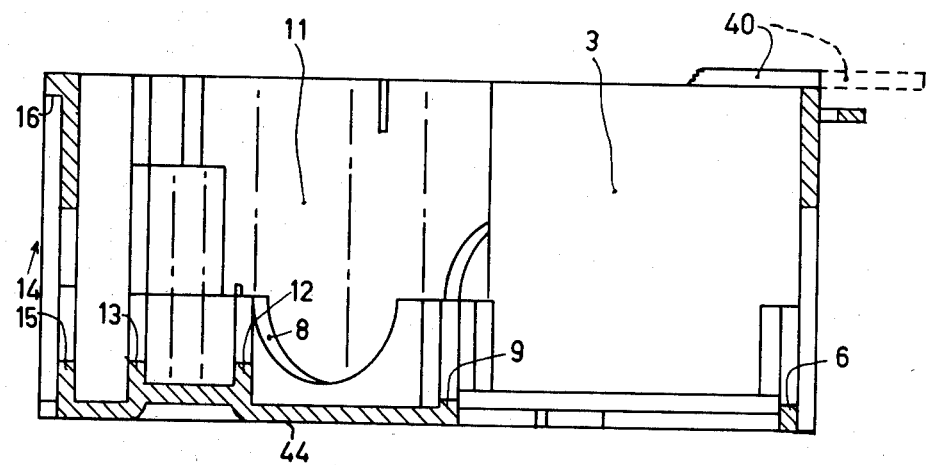
Figure 3:
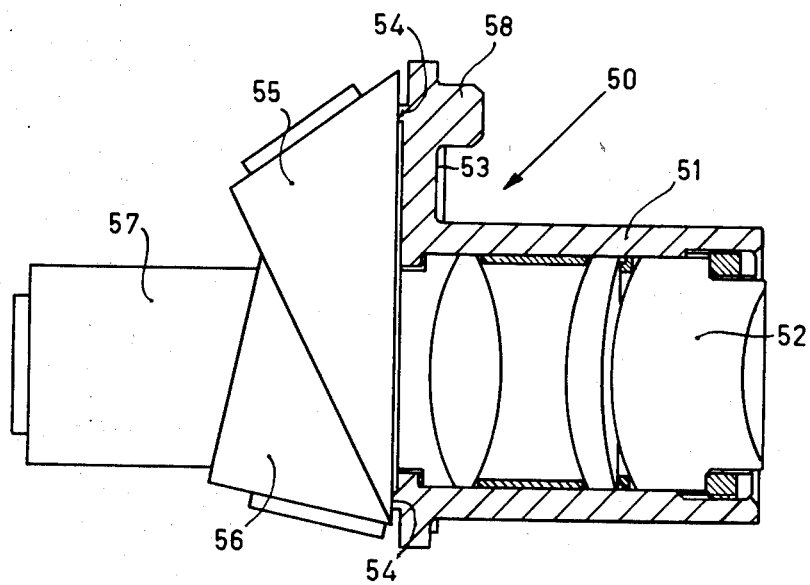

FIG. 1 is a diagrammatic view of a unilaterally open housing in accordance with the invention, FIG. 2 is a sectional view of this housing taken along the line II—II, and FIG. 3 diagrammatically shows a preferred embodiment of an optical distribution system.

The preferred embodiment of a camera housing 1 shown in FIG. 1 comprises three spaces 2, 3 and 4 having abutment faces 5, 6 and 7 which bound openings in transverse partitions of the housing and abutment faces 8, 9 and 10 which adjoin a space 11 for a distribution system. The distribution system for a colour camera is preferably formed by a colour splitting prism. The entrance sides of three pick-up tubes and deflection devices (not shown) face the space 11 and bear on the abutment faces 8, 9 and 10. The tube base sides and the associated deflection units bear on the abutment faces 5, 6 and 7. The tube base connections are accessible from the outside of the housing through the openings in the chamber wall which are co-determined by the abutment faces 5, 6 and 7. Inside the space 11 there are provided abutment faces 12 and 13 and a horizontal and vertical abutment or cam 45 for the exact mounting of a combination of the main lens and the distribution system in the housing. For the mounting of the pick-up tubes and the distribution system and the adjustment with respect to each other, the necessity of a direct rigid connection between the components is thus avoided. It is thus avoided that restoration of a disorientation of one of the components can disturb the position of the other components with respect to each other. This simplifies any readjustment of each of the pick-up tubes with respect to the distribution system.

For further components of the entrance optical system, such as the zoom lens which is situated outside the housing in this embodiment, the housing comprises a raised edge 16 which serves as a reference face. The housing wall is provided with borings at fixed locations for securing the lens system to the housing. A preferred embodiment comprises openings 17 and 18 besides an opening 14. Portions, for example 19 and 20, of the boundaries of these openings occupy a fixed position with respect to the optical axis through the entrance optical system. These faces 19 and 20 serve as abutment faces for an optical viewfinder to be accommodated in the housing. A viewfinder of this kind receives image information via a partially reflective mirror arranged in the main light path beam. Because this mirror must occupy a fixed position with respect to the viewfinder as well as with respect to the main lens, proper adjustment thereof in the camera is a necessity.

The spaces 2, 3 and 4 have been chosen to be so large that besides for the pick-up tubes and associated deflection units, they also offer space for electronic printed circuit boards accommodating electronic facilities, such as a preamplifier per pick-up tube, for each pick-up tube. Slots 21-26 can be provided for mounting these printed circuit boards. As a result, the printed circuit boards occupy a fixed position, which is advantageous for making connections and which simplifies any exchange.

In the lower walls of the spaces 2, 3 and 4 (viewed in the drawing) openings 27, 28 and 29 are provided for proper discharge of the heat developed in the pick-up tubes.

Furthermore, near the spaces for the printed circuit boards openings 30-35 are provided for discharging heat developed in the preamplifiers and also for the passage of supply leads for these preamplifiers.

The housing is preferably made as an injection moulding of synthetic material such as, for example, glass fiber polycarbonate, but may also be made of die-casting aluminum. The basic material of the housing may be chosen so that the thermal expansion coefficient corresponds to that of the components, such as the pick-up tubes, to be accommodated in the housing which are most sensitive to thermal expansion. In order to enable the use of the housing wall as a electrical shield also for components situated inside the housing, the housing can be made of an electrically conductive material or be provided with a conductive surface layer. It is alternatively possible to add a component to the synthetic material whereby adequate electrical conductivity is ensured. The second wall, in this case the upper wall 40, in the housing as shown in the FIGS. 1 and 2 extends mainly over recesses between the spaces for the said components, this wall does also form a projection which extends beyond the housing shown in these Figures and whereto electronic circuits and further components required for the camera can be secured. This projection gives the housing a great part of its strength and stiffness. A projection of this kind can also consist of a laterally projecting flange which can be connected to the housing in a fixed position by means of reference cams 41, 42 and 43. FIG. 2 shows a portion 44 of one of the parallel housing walls and also an outwards projecting portion 40 of the second parallel wall.

In a further preferred embodiment of the housing in accordance with the invention, the space for one of the pick-up tubes is directed more vertically to the main axis of the entrance optical system. An extension of the rigid housing in this direction can then also serve as a grip for carrying the camera during operation. As a result of the construction according to the invention, misadjustment of components in the camera is not liable to occur.

One of the pick-up tubes can then at least partly extend in the grip.

Because the positions of the pick-up tubes in a camera according to the invention can be exactly fixed and because the construction as well as the positioning of the distribution optical system is substantially more accurate, less severe requirements can be imposed as regards the accuracy of the pick-up tubes so as to realize a given ultimate image quality. These tubes may, therefore, be of a simpler construction and hence cheaper.

The phenomenon that the scanned area spot is substantially more distorted at the edges of the image plane than in the center is known to occur in pick-up tubes. The geometry in the image plane thus rather quickly deteriorates near the edge, measured from the center in the outwards direction. The adverse effect thereof on the image quality can be substantially reduced by using a smaller image plane on the target of the pick-up tube. When the less linear area is excluded from the scanning, a simple electronic superimposition can be effected by adaptation of the direct current components of the three pick-up tubes. As a result, the difficult mechanical adjustment can be dispensed with. Because a fixed dimension of the image is used for display on a monitor, so that the image is slightly enlarged, the resolution across the entire image will suffer slightly. However, considering the fields of application of this camera, this will certainly be acceptable, the more so because on the other hand the image quality is improved by the favourable adjustment. A comparatively cheap system can be used as the entrance optical system in a camera in accordance with the invention, notably in combination with reduced image-format pick-up tubes. In order to reduce any adverse effects of the lower optical quality of this optical system on the image formation, it is also desirable to position the light optical components exactly with respect to each other. In a camera in accordance with the invention, this can readily be achieved by the construction of the housing. This is because strictly defined abutment faces can also be provided on the rigid housing for these components, so that these components remain properly positioned once they have been mounted. FIG. 3 shows a preferred embodiment in accordance with the invention of a distribution optical system coupled to a main lens. A bush 50, having a cylindrical portion 51 which bears on the abutment faces 12 and 13 after having been mounted in the housing, accommodates a lens system 52 as the main lens for the camera. The bush 50 comprises a flange 53 with raised cams or a raised edge 54. A first prism 55 of the optical distribution system is mounted against this edge 54. A second prism 56 and a third prism 57 are successively mounted on the prism 55 and one on the other and are rigidly interconnected. Spacers (not shown) ensure that the prism faces do not contact each other at the areas where the image-carrying beam passes. The flange 53 furthermore comprises a cam 58. After mounting, this cam contacts an abutment face 45 in the housing. Inter alia due to this abutment face and the abutment faces 12 and 13 for the bush 50, the entire optical system occupies a fixed position inside the housing.

What is claimed is:

1. A television camera comprising more than one pick-up tube each having a given axis and an entrance optical system including an optical distribution system having a given axis, the entrance optical system and the pick-up tubes being situated in a plane containing the axis of the optical system with the axes of each of the pick-up tubes intersecting the axis of the optical system and one another, two walls extending parallel to said plane, a plurality of partition walls forming with said two walls an integral rigid housing, providing spaces for different components, said optical distribution system and the pick-up tubes being positioned each within one of said spaces with said pick-up tubes being positioned to receive an image from said optical distribution system.

2. A television camera as claimed in claim 1, wherein the housing comprises abutment faces for accurately positioning the pick-up tubes and the optical distribution system with respect to each other.

3. A television camera as claimed in claim 2, wherein the housing comprises partitions having cut-outs and abutment faces for mounting an entrance optical system.

4. A television camera as claimed in claim 3, wherein the housing comprises partitions defining a space with abutment faces for a viewfinder to be accommodated in the housing.

5. A television camera as claimed in claim 4, wherein one of the two parallel walls extends beyond the space for the pick-up tubes and the distribution optical system.

6. A television camera as claimed in claim 1 wherein the spaces for the pick-up tubes also accommodate a printed circuit board with electronic facilities for each pick-up tube.

7. A television camera as claimed in claim 1 wherein at least a portion of a partition wall of the space for one of the pick-up tubes is integral with a carrying grip for the camera.

8. A television camera as claimed in claim 1 wherein the housing consists of an injection molded synthetic material.

9. A television camera as claimed in claim 1 wherein the walls of the housing are electrically conductive.

10. A television camera as claimed in claim 1 wherein the optical distribution system, together with an entrance lens, is positioned in a holder which comprises bearing faces adapted to reference faces in the housing.

11. A television camera as claimed in claim 10, wherein the pick-up tubes are adapted to scan a reduced image format, the entrance optical system of the camera being adapted thereto.

12. A television camera as claimed in claim 1 wherein the housing comprises openings, the pick-up tubes comprising snap-locks for the external readjustment of the pick-up tubes with respect to the optical distribution system.

* * * * *